United States Patent
Jordan et al.

(10) Patent No.: US 8,727,361 B2
(45) Date of Patent: May 20, 2014

(54) DOLLY FOR SUPPORTING A SPOOL CARRYING A WINDABLE MATERIAL

(75) Inventors: David S. Jordan, Knoxville, TN (US); Michael C. Jordan, Knoxville, TN (US)

(73) Assignee: iTool Equipment Holding LLC, Knoxville, TN (US)

( * ) Notice: Subject to any disclaimer, the term of this patent is extended or adjusted under 35 U.S.C. 154(b) by 192 days.

(21) Appl. No.: 13/374,629

(22) Filed: Jan. 4, 2012

(65) Prior Publication Data

US 2012/0175854 A1 Jul. 12, 2012

Related U.S. Application Data

(60) Provisional application No. 61/460,706, filed on Jan. 6, 2011.

(51) Int. Cl.
*B62B 1/12* (2006.01)

(52) U.S. Cl.
USPC ............... 280/47.131; 280/79.6; 242/557; 242/596.4

(58) Field of Classification Search
USPC ............ 280/47.131, 47.16, 63, 79.11, 79.3, 280/79.6; 242/557, 570, 590, 596, 596.4, 242/598

See application file for complete search history.

(56) References Cited

U.S. PATENT DOCUMENTS

| | | | | |
|---|---|---|---|---|
| 4,095,706 | A * | 6/1978 | Schwien et al. | 414/24.6 |
| 5,042,737 | A * | 8/1991 | Sigle et al. | 242/423.1 |
| 7,484,684 | B2 * | 2/2009 | Saavedra et al. | 242/391 |
| 2008/0066808 | A1 * | 3/2008 | Stein | 137/355.12 |

* cited by examiner

*Primary Examiner* — John Walters
(74) *Attorney, Agent, or Firm* — Michael E. McKee (57) ABSTRACT

A dolly for supporting a spool carrying a windable material, such as rope, utilizes a wheeled frame including an elongated section having two opposite ends, a pair of wheels, and at least one floor-engaging for supporting, in conjunction with the wheels, the dolly upon a floor. A U-shaped bracket assembly having two legs and a base which extends between the two legs is secured to the elongated section of the frame, and a first tipped member is journaled to one leg of the U-shaped bracket for acceptance by a centrally-disposed hole provided in one end of the spool. A second tipped member is journaled to a threaded rod mounted in the other leg of the bracket for acceptance by a centrally-disposed hole provided in the other end of the spool.

16 Claims, 6 Drawing Sheets

DOLLY FOR SUPPORTING A SPOOL CARRYING A WINDABLE MATERIAL

BACKGROUND OF THE INVENTION

The benefit of Provisional Appln. Ser. No. 61/460,706, filed Jan. 6, 2011 and entitled DOLLY FOR SUPPORTING A SPOOL CARRYING A WINDABLE MATERIAL, is hereby claimed. The disclosure of this referenced provisional patent application is incorporated herein by reference.

This invention relates generally to means and methods for supporting relatively large spools and relates, more particularly, to apparatus capable of holding a spool of windable material, such as rope, wound about the spool, for purposes of supporting the spool as the windable material is unwound from the spool or wound about the spool.

During the construction of buildings, it is known that a length of material, such as a rope, can be used to route a wire (e.g. electrical wire) along a desired path through a ceiling or wall. To this end, one end of a length of material, such as a rope, can be routed along a path along which the electrical wire is desired to be routed, and then tied to a free end of the electrical wire. By subsequently pulling upon the opposite end of the length of material, the wire is pulled free end-first along the desired path.

Heretofore, spools of rope used at jobsites for the purpose of routing wires through a building are commonly supported by way of a rod inserted endwise through the center of the spool and two individuals who are positioned at each end of the rod for holding the spool in a manner which permits the spool to rotate about the rod during a rope unwinding or winding process.

It is an object of the present invention to provide a new and improved apparatus for supporting a spool of material, such as a rope, for rotation about an axis which circumvents the need that the spool be manually supported during an unwinding or winding of the spool of material.

Another object of the present invention is to provide such an apparatus upon which a spool of material can be loaded or unloaded with relative ease.

Still another object of the present invention is to provide such an apparatus which is capable of supporting a spool of material having a thickness within a relatively broad range.

Yet another object of the present invention is to provide such an apparatus which is uncomplicated in structure, yet effective in operation.

SUMMARY OF THE INVENTION

This invention resides in a dolly for supporting a spool carrying a windable material wherein the spool has two opposite end flanges and a centrally-disposed hole in each end flange.

The dolly includes a wheeled frame including an elongated section having two opposite ends, a pair of wheels which are supported in a spaced-apart relationship at one end of the elongated section, and at least one floor-engaging leg provided at the opposite end of the elongated section so that the at least one floor-engaging leg and the wheels cooperate to support the dolly upon a floor or underlying support surface. The dolly further includes a U-shaped bracket assembly having two legs and a base which extends between the two legs, and the base is secured to the elongated section for attachment of the bracket assembly to the elongated section. In addition, a first tipped member is journaled to one leg of the U-shaped bracket for acceptance by the centrally-disposed hole provided in one end flange, and a second tipped member is journaled to the other end of the U-shaped bracket for acceptance by the centrally-disposed hole provided in the other end flange of the spool so that upon positioning the spool between the legs of the U-shaped bracket, the tipped members can be manipulated into the centrally-disposed holes provided in the end flanges of the spool for supporting the spool within the U-shaped bracket.

DETAILED DESCRIPTION OF AN ILLUSTRATIVE EMBODIMENT

Figure 1:
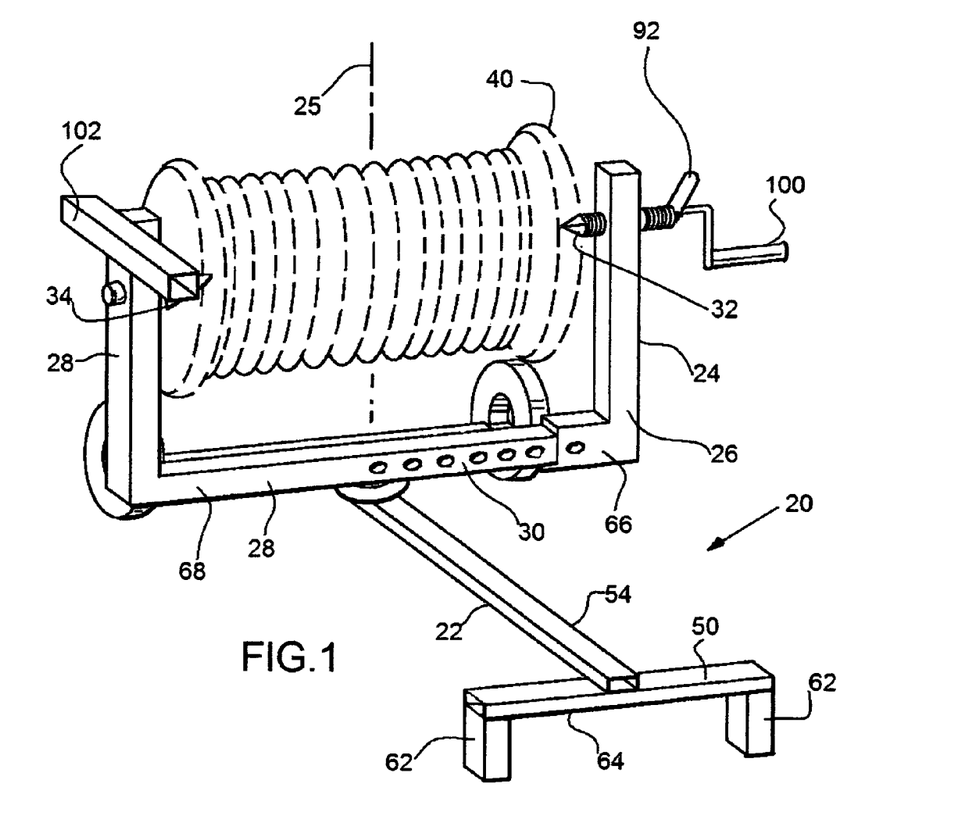
FIG. 1 is a perspective view of an embodiment of a dolly within which features of the present invention are incorporated.

Turning now to the drawings in greater detail and considering first FIG. 1, there is illustrated an embodiment, generally indicated 20, of a dolly within which features of the present invention are embodied. The dolly 20 includes a wheeled frame 22 adapted to rest upon a floor or underlying support surface and a U-shaped bracket 24 which is pivotally attached to the wheeled frame 22 for rotation relative to the wheeled base 22 about an axis 25. The U-shaped bracket 24 has two opposite legs 26, 28 and a base 30 which extends between the two legs 26, 28. Associated with the legs 26, 28 are a pair of tipped members 32, 34 which are supported in a spaced-apart relationship with one another and whose tips are axially aligned with one another. By securing a spool of wound material, such as rope, between the tipped members 32, 34, the spool can be transported upon the dolly 20 between job sites and is supported by the dolly 20 for rotation as the wound material is unwound from the spool or as the material is wound (or re-wound) about the spool.

Figure 2:
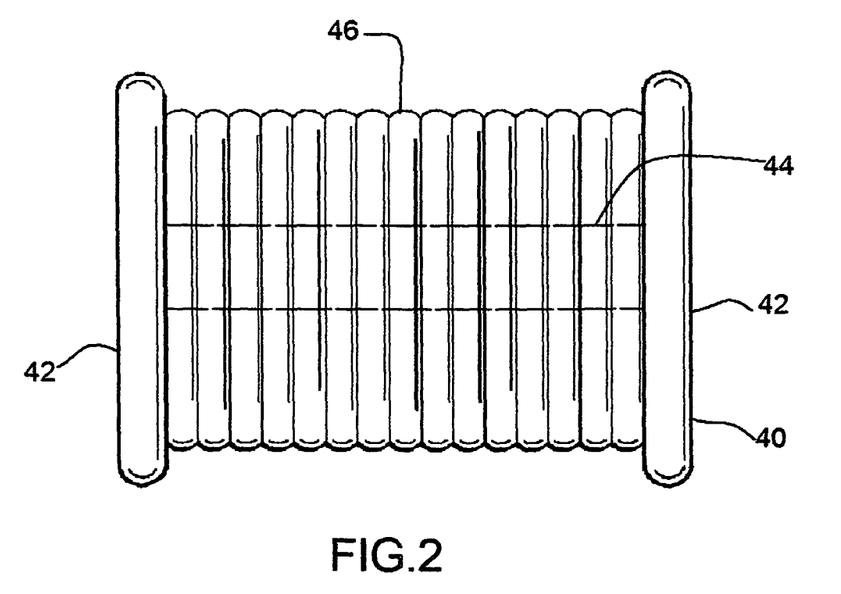
FIG. 2 is a side elevational view of an exemplary spool of rope capable of being supported by the FIG. 1 dolly.
Figure 3:
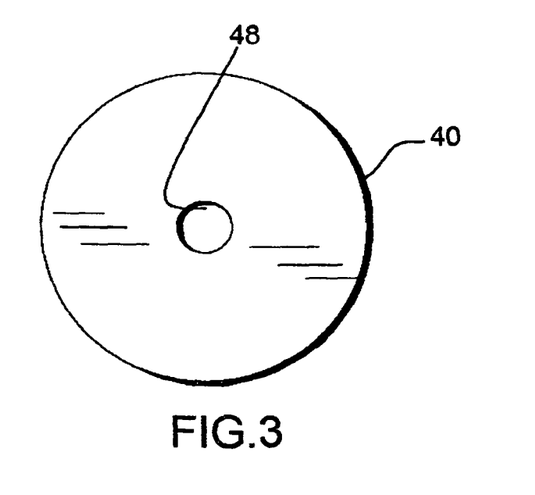
FIG. 3 is a end elevational view of the FIG. 2 spool as seen generally from the right in FIG. 2.

With reference to FIGS. 2 and 3, there is illustrated an example of a spool, indicated 40, of wound material which is capable of being supported by the dolly 20. In particular, the spool 40 includes a pair of end flanges 42, 42 between which a hollow core 44 extends and a length of rope 46 which is wound about the core 44. In addition and as best shown in FIG. 3, each end flange 42 has a centrally-disposed hole 48 provided therein. As will be apparent herein, the holes 48 are adapted to accept the tipped members 32, 34 positioned therein when the dolly 20 is used to support a spool 40. Commonly, the end flanges 42 are constructed of wood, but alternative materials can be used.

Figure 4:
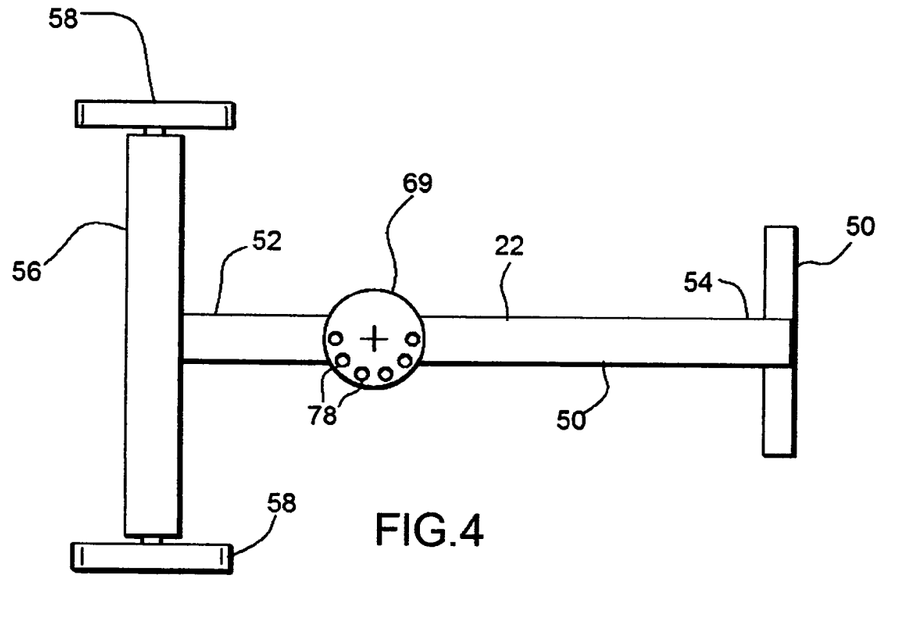
FIG. 4 is a top plan view of the wheeled frame of the FIG. 1 dolly.

With reference to FIG. 4, the wheeled frame 22 includes an elongated section 50 having two opposite ends 52, 54 and an axle portion 56 which is joined to the elongated section 50 at a substantially right angle with respect thereto. Journaled at each end of the axle portion 56 are a pair of wheels 58 which permit the dolly 20 to be rolled across a floor. Each of the elongated section 50 and axle portion 56 (as well as several other components of the dolly 20) are preferably constructed of steel, such as a hollow steel channel possessing a substantially square cross section, which can be joined together with welds.

With reference again to FIG. 1, there is associated with the other end 54 of the elongated section is a U-shaped section 60 having a pair of floor-engaging legs 62 and a base 64 which extends between the legs 62. When the dolly 20 is positioned upon the floor in the disposition illustrated in FIG. 1, the weight of the dolly 60 (and a spool 40 positioned thereupon) is transferred to the underlying floor through the wheels 58 and the floor-engaging legs 62. When securing a spool 40 upon the dolly 20, the elongated section 50 can be oriented upright and in a near-vertical orientation. When the elongated section 50 is disposed in this near-vertical orientation, the pair of legs 62, 64 of the U-shaped section 60 can provide pair of handles with which the dolly 20 can be manually moved and manipulated across the floor.

There is also provided upon the elongated section 50 a plate-like circular mount 69 upon which the U-shaped bracket 24 is mounted. As seen in FIG. 4, the mount 69 is disposed medially along the length of the elongated section 50, and the U-shaped bracket 24 is rotatably mounted upon the mount 50.

Figure 5:
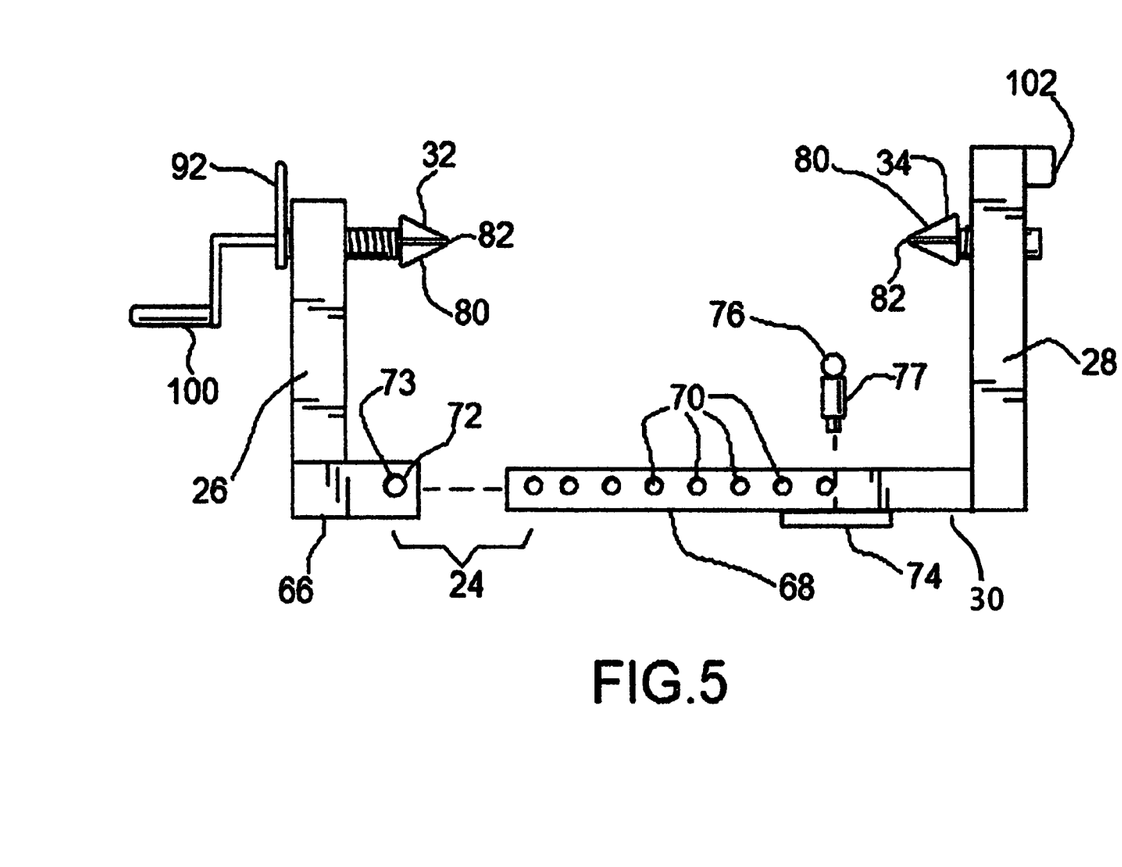
FIG. 5 is a side elevational view of the U-shaped bracket of the FIG. 1 dolly, shown exploded.

With reference to FIGS. 1 and 5, the base 30 of the U-shaped bracket 24 includes two sections 66 and 68 wherein one section 66 is slidably accepted upon an end portion of the section 68 to accommodate a repositioning of the section 66 along the length of the section 68. The section 68 is provided with a series of openings 70 provided along the length thereof, and the section 66 is provided with a spring-biased pin 72 (provided with a housing 73 thereabout) wherein the housing 73 is secured to the section 66 so that the pin 72 is capable of being selectively accepted by any of the openings 70. In other words, the base sections 66 and 68 can be fixedly secured to one another by positioning the section 66 at a desired location along the length of the section 68 so that the pin 72 is disposed in axial registry, or aligned, with one of the openings 70 and then directing the pin 72 through a side of the section 66 and into the opening 70.

In addition, a plate-like spindle member 74 is fixedly joined to the underside of the section 68 along the length thereof, and the spindle member 74 is, in turn, rotatably mounted upon the mount 69 (FIG. 4) joined to the elongated section 50 to accommodate a pivoting of the U-shaped bracket 24 relative to the elongated section 50 about the axis 25 and between one condition at which the base 30 is oriented generally parallel to the elongated section 50 and another condition at which the base 30 is disposed at substantially a right angle with respect to the elongated section 50. In addition, a spring-biased pin 76 (FIG. 5) provided with a housing 77 thereabout is mounted within the spindle member 74 (and secured thereto by way of the housing 77) adjacent the periphery thereof, and a plurality of openings 78 (FIG. 4) are provided along the periphery of the mount 69 to permit the U-shaped bracket 24 to be releasably secured in a desired positional relationship with respect to the elongated section 50. To this end, the pin 76 is withdrawn from the mount 69 to permit the U-shaped bracket 24 to be pivoted about the axis 25 and relative to the mount 69 to a desired angular position with respect thereto at which the pin 76 is positioned in axial registry, or aligned, with a desired opening 78 provided along the periphery of the mount 69. The pin 76 is thereafter permitted to move into the opening 78 to thereby releasably secure the bracket 24 to the elongated section 50 in a desired angular relationship with respect thereto.

As best shown in FIG. 5, the leg 26 is secured to the section 66 of the base 30 so as to extend at substantially a right angle (e.g. upwardly) with respect thereto, and the leg 28 is secured to the section 68 of the base 30 so as to extend at substantially a right angle with respect thereto. The tipped members 32, 34 are, in turn, mounted upon the legs 26, 28 so as to be substantially axially aligned with one another. It follows from the foregoing that the sections 66 and 68 can be moved toward or away from one another to alter the relative position, or spaced distance, between the tipped members 32, 34.

Figure 6:
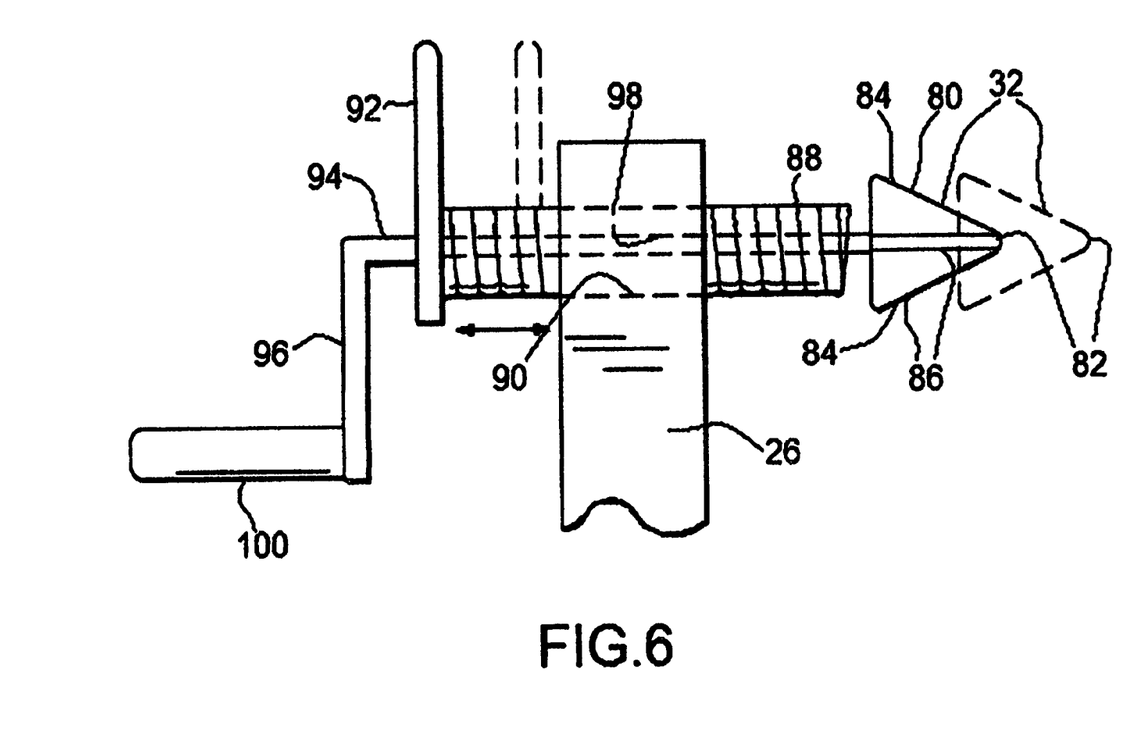
FIG. 6 is a view of a fragment of the FIG. 5 bracket, drawn to a slightly larger scale.

With reference to FIG. 6, each of the tipped member 32 and 34 has a finned body 80 which, in appearance, somewhat resembles the shape of a dart having a side fins 84 which are regularly arranged about the longitudinal axis of the body 80 and which extend along the body 80 from a tip 82 and wherein the diameter of the body 80 increases in size as a path is traced therealong from the tip 82. In the depicted dolly 20, the side fins 84 are provided with radially-extending edges 86, and the tip 82 of each tipped member 32 or 34 is adapted to be partly accepted by a corresponding one of the centrally-disposed holes 48 provided in the end flanges 42 of the spool 40. When the tipped members 32, 34 are tightened within the centrally-disposed holes 48 provided in the opposite end flanges 42 of the spool 40 (in a manner described herein), the side fins 84 cooperate with (i.e. bite into) the end flanges 42 of the spool 40 to prevent relative rotation between the spool 40 and the tipped members 32, 34.

One tipped member 34 (FIG. 5) is rotatably mounted upon the leg 28 to permit the tipped member 34 to rotate freely relative to the leg 28 about the longitudinal axis of the member 34. In addition, an additional elongated member 102 (constructed, for example, of a section of steel having a square cross section) can be secured to the leg 28 adjacent the upper end thereof, as viewed in FIGS. 1 and 5, and at a right angle with respect thereto. When orienting the dolly 20 so that its elongated section 50 is in a near-vertical condition, the member 102 cooperates with the wheels 58 to provide a relatively stable, three-point base for resting the dolly 20 upon the floor.

Meanwhile and with reference again to FIG. 6, the dolly 20 includes a hollow threaded rod 88 which is interposed between the leg 26 of the U-shaped bracket 24 and the tipped member 32 so that by rotating the threaded rod 88 relative to the leg 26, the tipped members 32 and 34 can be moved toward or away from one another for the purposes of tightening or loosening the axial pressure applied to the end flanges 42, 42 of the spool 40 by way of the tipped members 32, 34. In this connection, the leg 26 includes an internally-threaded bore 90 within which the threaded rod 88 is threadably received so that by rotating the rod 88 within the base 90 and with respect to the leg 26, the tipped member 32 can be moved toward or away from the other tipped member 34 and between, for example, its solid and phantom-line positions illustrated in FIG. 6. A handle member 92 is fixedly attached to the rod 88 at the end thereof disposed outboard of the bracket 24 to facilitate the manual rotation of the rod 88 by a user.

In addition, the hollow treaded rod 88 includes a central through-bore 98 which extends axially therealong, and one leg, indicated 94, of a Z-shaped crank 96 extends through the through-bore 98 and is fixedly secured to the end of the tipped member 32 opposite the tip 82 for rotation therewith. By rotating the handle, indicated 100, of the crank 96 (wherein the handle 100 is provided by one leg of the Z-shape of the crank 96) in order to rotate the leg 94 within the through-bore 98, the tipped member 32 is rotated, as well. When a spool 40 is securely supported between the tipped members 32, 34 (so that the tipped members 32, 34 bite into the spool flanges 42, 42), the crank 96 (by way of the handle 100) can be used to manually wind (or re-wind) an unwound rope 46 about the core 44 of the spool 40.

It follows from the foregoing that a dolly 20 has been described which is capable of supporting a rope-carrying spool 40 wherein the dolly 20 includes a wheeled frame 22 including an elongated section 50 having two opposite ends 52, 54, a pair of wheels 58 which are supported in a spaced-apart relationship at one end 52 of the elongated section 50, and at least one floor-engaging leg 62 provided at the opposite end 52 of the elongated section 50 so that the at least one floor-engaging leg 62 and the wheels 58 cooperate to support the dolly 20 upon a floor or underlying support surface.

Also included is a U-shaped bracket 24 having two legs 26, 28 and a base 30 which extends between the two legs 26, 28, and the base 30 is secured to the elongated section 50 for attachment of the bracket 24 to the elongated section 50. Moreover, a first tipped member 34 is journaled to one leg 28 of the U-shaped bracket 24 for acceptance by the centrally-disposed hole 48 provided in one end flange 42 of the spool 40, and a second tipped member 32 is journaled to the threaded rod 88 at one end thereof for acceptance by the centrally-disposed hole 48 provided in the other end flange 42 of the spool 40 so that upon positioning the spool 40 between the legs 26, 28 of the U-shaped bracket 24, the tipped members 32, 34 can be manipulated into the centrally-disposed holes 48 provided in the end flanges 42 of the spool 40 for supporting the spool 40 within the U-shaped bracket 24.

To facilitate the initial positioning of a spool 40 which is lying upon a floor alongside the dolly 20, the dolly 20 can be oriented so that its elongated section 50 is arranged substantially vertically so that the dolly 20 is supported upon its pair of wheels 58 and one end of the member 102 (FIG. 2). With the dolly 20 arranged in such an orientation, the U-shaped bracket 24 can be manipulated about the opposite ends of the spool 40 so that the tipped members 32, 34 (which are spaced apart by a distance sufficient to accommodate the acceptance of the spool 40 therebetween) are disposed in axial registry with the centrally-disposed holes 48 of the spool 40. The handle 92 can then be appropriately rotated relative to the leg 26 to tightly capture the end flanges 42, 42 of the spool 40 between the tipped members 32, 34.

It will be understood that numerous modifications and substitutions can be had to the aforedescribed embodiment 20 without departing from the spirit of the invention. For example, although the aforedescribed dolly 20 has not been described as possessing an axle which extends between the tipped members 32, 34, an alternative embodiment of a dolly could possess such an axle. By way of example, such an axle could be slidably received by axially-extending bores provided through the center of each of the tipped members to accommodate a sliding movement between the axle and (at least one of the) tipped members when adjusting the spaced distance between the tipped members.

Figure 7:
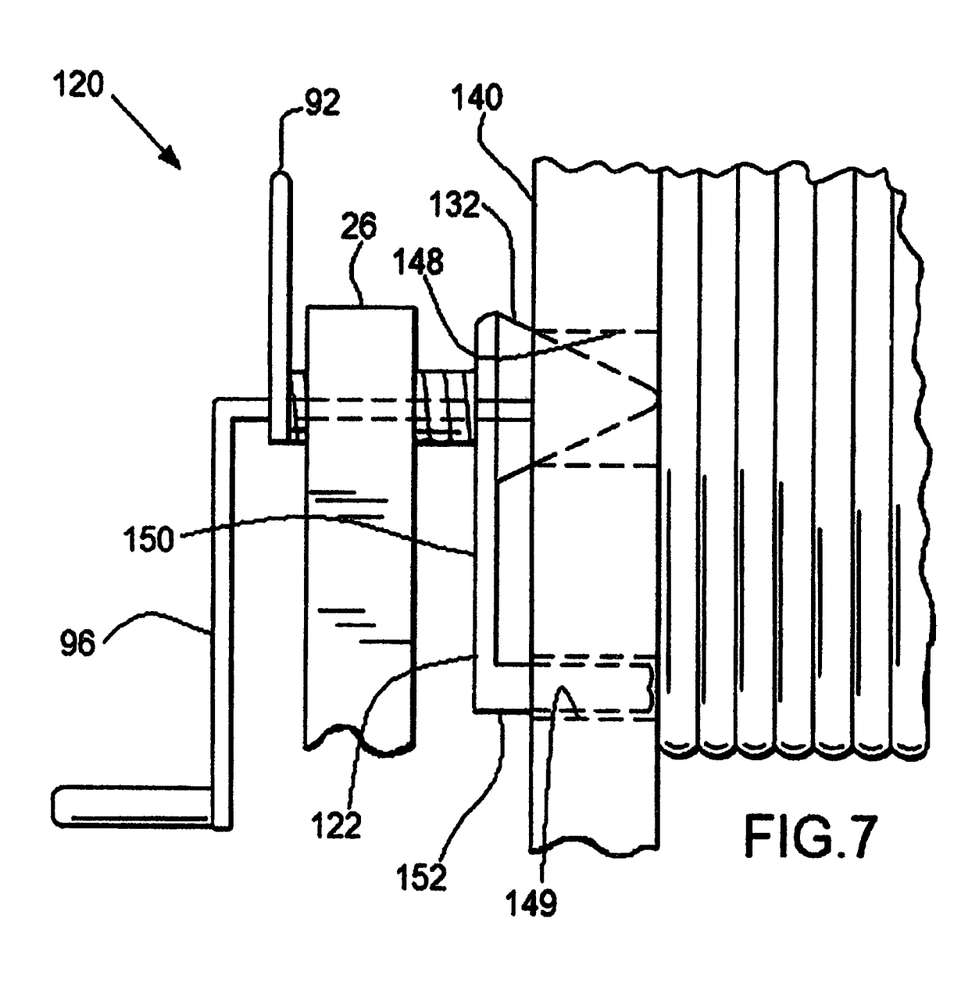
FIG. 7 is a side elevational view of a fragment of another embodiment of a dolly.

Furthermore, there is illustrated in FIG. 7 another embodiment of a dolly, generally indicated 120, having an additional member 122 which is associated with the tipped member 132 (of its two tipped members) for cooperatively interconnecting with a spool, generally indicated 140, having an end flange 142 which is provided with a bore 149 disposed to one side of its centrally-disposed hole 148. Components of the dolly 120 which are identical to those of the dolly 20 of FIGS. 1 and 4-6 accordingly bear the same reference numerals. In the depicted dolly 120, the member 122 is L-shaped in form having one leg 150 which is fixedly secured to a tipped member 132 and another leg 152 which is accepted by the bore 149 so that the member 122 must rotate as the tipped member 132 is rotated.

Insofar as the rotation of the spool 40 of FIGS. 2 and 3 in conjunction with the tipped member 32 depends largely upon the frictional-gripping engagement between the tipped member 32 and the corresponding end flange of the spool 40, the member 122 of the FIG. 7 dolly 120 reduces the need for frictional engagement between the tipped member 132 and the spool 140 to effect rotation of the spool 140 in conjunction with the rotation of the tipped member 132 because the tipped member 132 is locked in position with the spool 140 by way of the member 122. It will be understood that when positioning a spool 140 upon the dolly 120 and between the tipped members thereof, the leg 152 of the L-shaped member 152 is moved into the bore 49 of the spool and flange 142 as the handle 92 is rotated to move the tipped member 132 into the hole 148 of the end flange 142.

Accordingly, the aforedescribed embodiment 20 is intended for the purpose of illustration and not as limitation.

The invention claimed is:

1. A dolly for supporting a spool carrying a windable material wherein the spool has two opposite end flanges and a centrally-disposed hole in each end flange, the dolly comprising:

a wheeled frame including an elongated section having two opposite ends, a pair of wheels which are supported in a spaced-apart relationship at one end of the elongated section, and at least one floor-engaging leg provided at the opposite end of the elongated section so that the at least one floor-engaging leg and the wheels cooperate to support the dolly upon a floor or underlying support surface;

a U-shaped bracket assembly having two legs and a base which extends between the two legs, and the base is secured to the elongated section for attachment of the U-shaped bracket assembly to the elongated section;

a first tipped member which is journaled to one leg of the U-shaped bracket for acceptance by the centrally-disposed hole provided in one end flange;

a second tipped member which is journaled to the other leg of the U-shaped bracket for acceptance by the centrally-disposed hole provided in the other end flange of the spool so that upon positioning the spool between the legs of the U-shaped bracket, the tipped members can be manipulated into the centrally-disposed holes provided in the end flanges of the spool for supporting the spool within the U-shaped bracket; and a threaded rod interposed between the other leg of the U-shaped bracket and the second tipped member so that by rotating the threaded rod relative to the other lea, the second tipped member can be moved toward or away from the first tipped member for tightening or loosening the axial pressure applied to the end flanges of the spool by way of the tipped members.

2. The dolly as defined in claim 1 wherein the other leg of the U-shaped bracket is attached to the base of the U-shaped bracket to accommodate an adjustment in the spaced-apart distance between the two legs of the U-shaped bracket to accommodate spools having end flanges which are spaced apart by a distance within a range of distances.

3. The dolly as defined in claim 1 wherein the U-shaped bracket is pivotally connected to the elongated section of the wheeled frame to permit a pivotal movement of the U-shaped bracket relative to the elongated section between alternative angular positions.

4. The dolly as defined in claim 1 wherein each of the tipped members includes an elongated body having two opposite ends and a tip at one end thereof and whose thickness increases as a path is traced axially therealong from the tip thereof toward the other end of the body.

5. The dolly as defined in claim 4 wherein the body of each tipped member includes side surfaces which extend along the body from the tip thereof toward the other end of the body so that when the tipped members are tightened within the centrally-disposed holes provided in the end flanges of the spool, the side surfaces cooperate with the end flanges to prevent relative rotation between the spool and the tipped members.

6. The dolly as defined in claim 5 wherein the side surfaces which extend along the body of each tipped member are provided with radially-extending fins.

7. The dolly as defined in claim 6 further including a threaded rod interposed between the other leg of the U-shaped bracket and the second tipped member so that by rotating the threaded rod relative to the other leg, the second tipped member can be moved toward or away from the first tipped member for tightening or loosening the axial pressure applied to the end flanges of the spool by way of the tipped members, and the treaded rod includes a through-bore extending axially therealong, and a crank is secured to the second tipped member by way of the axially-extending through-bore to permit a user to selectively unwind the windable material from the spool or wind the windable material upon the spool by rotating the crank relative to the threaded rod.

8. The dolly as defined in claim 7 further including a handle member which is connected to the threaded rod to facilitate the rotation of the threaded rod relative to the other leg of the U-shaped bracket.

9. The dolly as defined in claim 1 wherein the at least one floor-engaging leg is adapted to provide a handle with which the dolly can be raised and lowered at one end of the elongated section for the purpose of moving the dolly between alternative sites.

10. A dolly for supporting a spool carrying a windable material wherein the spool has two opposite end flanges and a centrally-disposed hole in each end flange, the dolly comprising:
   a wheeled frame including an elongated section having two opposite ends, a pair of wheels which are supported in a spaced-apart relationship at one end of the elongated section, and at least one floor-engaging leg provided at the opposite end of the elongated section so that the at least one floor-engaging leg and the wheels cooperate to support the dolly upon a floor or underlying support surface;
   a U-shaped bracket assembly having two legs and a base which extends between the two legs, and the base is secured to the elongated section for attachment of the U-shaped bracket assembly to the elongated section;
   a first tipped member which is journaled to one leg of the U-shaped bracket for acceptance by the centrally-disposed hole provided in one end flange;
   a second tipped member which is journaled to the other leg of the U-shaped bracket for acceptance by the centrally-disposed hole provided in the other end flange of the spool so that upon positioning the spool between the legs of the U-shaped bracket, the tipped members can be manipulated into the centrally-disposed holes provided in the end flanges of the spool for supporting the spool within the U-shaped bracket
   wherein the other leg is mounted upon the base of the U-shaped bracket to accommodate a sliding movement of the other leg with respect to and along the length of the base, and the U-shaped bracket includes means for releasably securing the other leg at alternative positions along the length of the base.

11. A dolly for supporting a spool carrying a windable material wherein the spool has two opposite end flanges and a centrally-disposed hole in each end flange, the dolly comprising:
   a first tipped member and a second tipped member;
   means for supporting the first and second tipped members outboard of the two opposite end flanges of the spool and in axial registry with one another;
   means associated with the supporting means for moving the first and second tipped members toward and away from one another to accommodate the movement of the tipped members into the centrally-disposed holes of the opposite end flanges of the spool and into a secured relationship therewith and means permitting the rotation of the first and second tipped members about a rotation axis corresponding with the axis of registry of the tipped members so that rotation of the tipped members about the rotation axis effects the rotation of the spool about the rotation axis; and
   a wheeled frame upon which the supporting means is mounted enabling the supporting means, and any spool supported thereby, to be moved across a floor or underlying support structure as the wheels of the frame move in rolling engagement with the floor or underlying support structure
   wherein the supporting means includes a U-shaped bracket assembly having two legs and a base which extends between the two leas, and the base is secured to the wheeled frame for securement of the U-shaped bracket upon the wheeled frame;
   wherein the wheeled frame includes an elongated section having two opposite ends, a pair of wheels which are supported in a spaced-apart relationship at one end of the elongated section, and at least one floor-engaging leg provided at the opposite end of the elongated section so that the at least one floor-engaging leg and the wheels cooperate to support the dolly upon a floor or underlying support surface, and the U-shaped bracket is mounted upon the elongated section to accommodate a rotation of the U-shaped bracket relative to the wheeled frame to permit an alternation of the angular disposition of the U-shaped bracket, and any spool supported thereby, relative to the wheeled frame; and
   wherein the first tipped member is journaled to one leg of the U-shaped bracket for acceptance by the centrally-disposed hole provided in one end flange of the spool, and the second tipped member is journaled to the other leg of the U-shaped bracket for acceptance by the centrally-disposed hole provided in the other end flange of the spool so that upon positioning the spool between the legs of the U-shaped bracket, the tipped members can be manipulated into the centrally-disposed holes provided in the end flanges of the spool for supporting the spool within the U-shaped bracket, and the dolly further includes
   a threaded rod which interposed between the other leg of the U-shaped bracket and the second tipped member so that by rotating the threaded rod relative to the other leg, the second tipped member can be moved toward or away from the first tipped member for tightening or loosening the axial pressure applied to the end flanges of the spool by way of the tipped members.

12. The dolly as defined in claim 11 wherein the legs of the U-shaped bracket are attached to the base of the U-shaped bracket to accommodate an adjustment in the spaced-apart distance between the two legs of the U-shaped bracket to accommodate spools having end flanges which are spaced apart by a distance within a range of spaced distances.

13. The dolly as defined in claim 11 wherein the base of the U-shaped bracket is attached to the wheeled frame to accommodate a rotation of the U-shaped bracket relative to the wheeled frame to permit an alternation of the angular disposition of the U-shaped bracket, and any spool supported thereby, relative to the wheeled frame.

14. The dolly as defined in claim 13 wherein the wheeled frame includes a spindle member, and the U-shaped bracket is mounted upon the spindle member to accommodate an alteration of the angular disposition of the U-shaped bracket relative to the wheeled frame.

15. The dolly as defined in claim 11 further including a handle member which is connected to the threaded rod to facilitate the rotation of the threaded rod relative to the other leg of the U-shaped bracket.

16. The dolly as defined in claim 15 wherein the at least one floor-engaging leg is adapted to provide a handle with which the dolly can be raised and lowered at one end of the elongated section for the purpose of moving the dolly between alternative sites.

\* \* \* \* \*